May 30, 1967

A. B. MUSICHUK 3,322,436

COASTER WAGON

Filed Oct. 1, 1965

INVENTOR.
ALEXANDER B. MUSICHUK
BY
ATTORNEYS.

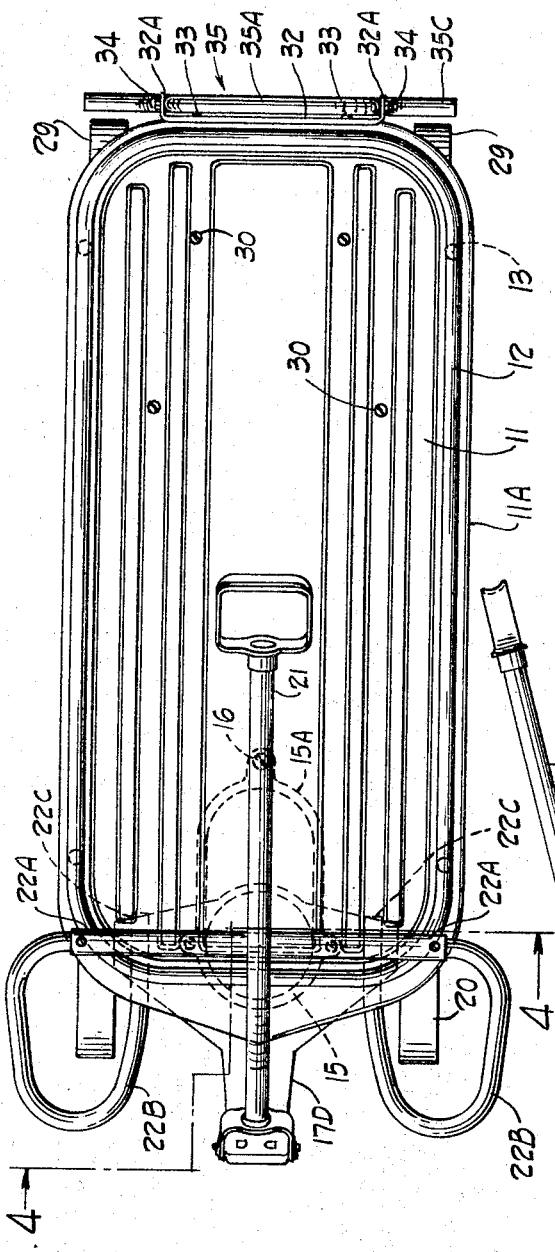
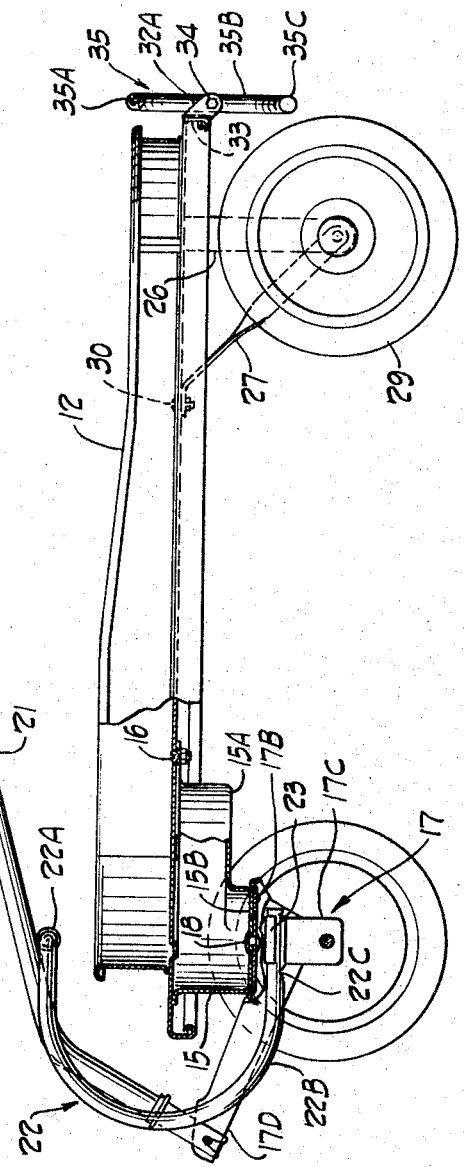
Fig.2
Fig.3
INVENTOR.
ALEXANDER B. MUSICHUK

United States Patent Office 3,322,436
Patented May 30, 1967

3,322,436
COASTER WAGON
Alexander B. Musichuk, Parma, Ohio, assignor to The M. T. & D. Company, a corporation of Ohio
Filed Oct. 1, 1965, Ser. No. 491,943
10 Claims. (Cl. 280—87.01)

ABSTRACT OF THE DISCLOSURE

A coaster wagon, having a tiller steering apparatus, the tiller having a bight portion above the forward portion of the wagon body in the general vertical plane of the front steerable bolster turnable generally about the axis of the bolster king-pin, and manipulatable by the rider on the wagon body rearwardly of the said bight portion, and having a brake mechanism pivotally carried by the wagon body having lower portions movable forwardly against the rear wagon wheels by the rider pressing rearwardly upon upwardly extending portions of the brake mechanism.

My invention relates to coaster wagons.

An object of my invention is to provide an improved coaster wagon having improved steering and braking features.

Another object is the provision of a coaster wagon having a tiller structure for steering the wagon to provide ease of operation and better control in steering.

Another object is the provision for safer and more readily operable braking structure in a coaster wagon.

Another object is the provision of the unique combination of steering and braking structures giving superior results in the use of a coaster wagon.

Another object is to provide new results in the use of a coaster wagon by a novel structure operable in a unique manner.

Other objects and a fuller understanding of the invention may be had by referring to the following description and claims, taken in conjunction with the accompanying drawings, in which:

FIGURE 2 is a plan view of my improved coaster wagon;

FIGURE 3 is a side view of my improved coaster wagon, partially in section; and

Figure 1:
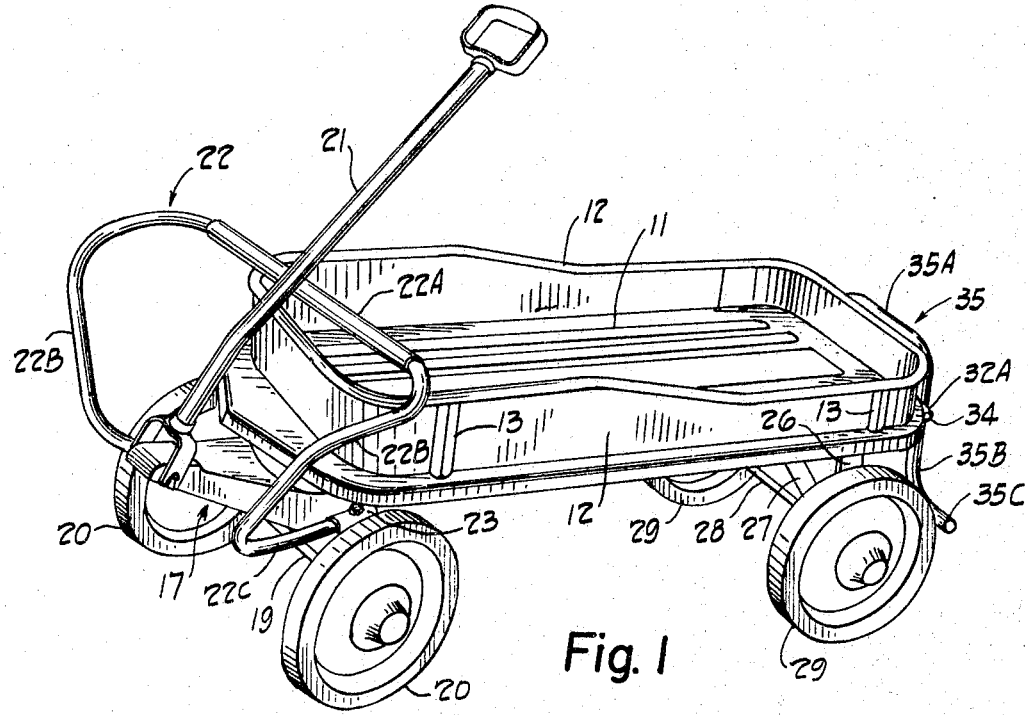
FIGURE 1 is a perspective view of a coaster wagon embodying my invention.
Figure 4:
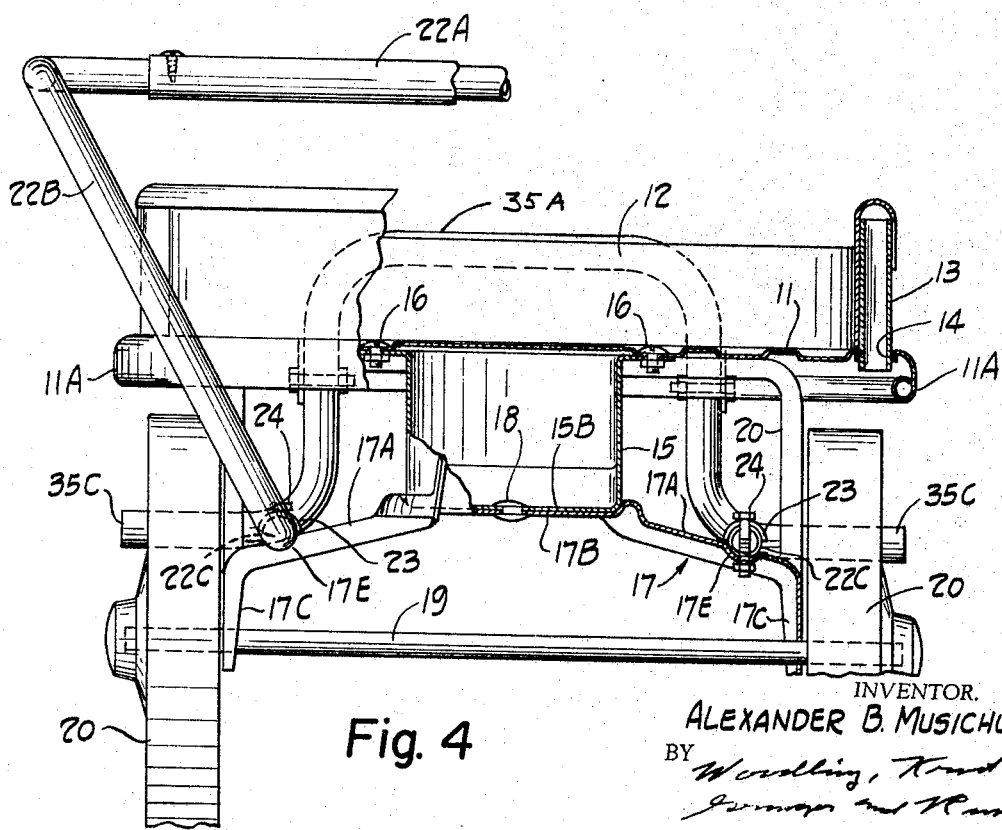
FIGURE 4 is an enlarged front view of my improved coaster wagon, partially in section and with portions broken away for purposes of clarity of illustration.

My coaster wagon is of the general class used by children in coasting down a hill or grade and which may also be used by them for pulling or hauling as in the case of the usual children's wagon.

My coaster wagon has a flat body portion 11 preferably made of pressed steel suitably corrugated for strength and rigidity. The body is provided with sides formed in a rectangle shape so disposed as to stand upright on the flat body 11. Four upright posts 13 are secured to the rails making up the sides 12 of the wagon, these posts being accommodated in four openings 14 provided along the sides of the wagon. As seen in the drawings, the lateral sides and front and rear sides of the body 11 are formed to provide an edge portion 11A extending around the body 11, which edge portion 11A adds strength and rigidity to the wagon. The lower ends of the posts 13 are readily removable from the openings 14 so that the sides 12 as a unit may be removed from the wagon when it is desired to use the wagon without any rails around the flat body 11.

To provide a fifth wheel arrangement for the support and steering of the front wagon wheels, a sheet metal cup member 15 is secured to the bottom of the body 11 by nut and bolt assemblies 16. This cup member 15 has a rearwardly extending portion 15A provided for adding strength and rigidity to the structure. The bottom of the cylindrical portion of the cup member 15 has a horizontally disposed bottom wall 15B.

A front bolster indicated by the reference character 17 has a horizontally disposed upper wall 17B which slidably engages with the wall 15B of the cup member 15. A kingpin 18 which provides the pivot for the front bolster 17 interconnects the walls 15B and 17B in such manner as to permit the wall 17B to freely swing on the pivot provided by pin 18 relative to the wall 15B. A bead of annular shape raised up from the level of the wall 17B around the cup member 15 aids in giving guidance to the pivotal movement of the front bolster 17.

Wing portions 17A of the front bolster 17 extend in opposite directions laterally outward and downwardly and terminate in axle-accommodating end portions 17C. The front axle 19 extends through aligned openings in the end portions 17C in the usual manner. Front wheels 20 are journaled on the opposite ends of the axle 19 in the usual manner. Extending forwardly of the wing portions 17A is a tongue-engaging portion 17D which protrudes forwardly from the wagon in the usual manner. The tongue type handle 21 is detachably secured to the front end of the portion 17D so as to be readily mounted and demounted therefrom. When it is desired to pull the wagon or to use it in the usual and orthodox manner, then the tongue type handle 21 is secured to the portion 17D. When it is desired to steer the coaster wagon by the novel tiller structure disclosed, the tongue type handle 21 may be removed.

My wagon incorporates a novel steering structure provided by a tiller indicated generally by the reference character 22. This tiller 22 is of U-shape as viewed from the front with the base of the U being relatively long and being uppermost. In production, the tiller is preferably of tubular steel in two sections, being joined together at the bight portion by a plastic or other composition handlebar portion 22A. By having the plastic or other composition handle secured to the upper ends of the two sections of formed tubing by means of screws or other suitable means, a unitary tiller structure in effect is provided. It is to be noted that the bight portion is relatively straight and in a horizontal plane and disposed over or above the front portion of the body 11 of the wagon. Extending downwardly and forwardly as illustrated in a gradual curve from the bight portion 22A are the side portions 22B. Near the lower ends of the side portions 22B they converge as illustrated and hence are bent rearwardly to form the lower end portions 22C which are in a generally horizontal plane and parallel to each other. When the bolster 17 is straight or not turned relative to the wagon body, then the lower end portions 22C extend generally longitudinally of the wagon body.

To accommodate and help secure the two lower end portions 22C to the bolster 17, depressed grooves 17E are formed in the upper surfaces of the two wing portions 17A of the front bolster 17, the bolster 17 also preferably being of stamped metal such as steel. The end portions 22C are cradled or accommodated in these parallel grooves 17E thus formed. Disposed over each of the end portions 22C is a channel clamp 23 which is semi-circular in cross-section and extends along the tops of the respective portions 22C. Nut and bolt assemblies 24 extend through aligned openings in the clamp 23, end portions 22C and wing portions 17A, whereby the lower end portions 22C of the tiller structure are firmly held and clamped in position to the respective wing portions 17A of the front bolster 17.

The arrangement is such that the rider or user sitting or kneeling in the wagon and coasting therein may readily swing the bight portion 22A of the tiller and thereby correspondingly swing the front bolster 17, front axle 19 carried thereby and the front wheels 20. It is to be noted that the tiller may be readily swung without interference from the wagon body by reason of the disposition of the parts of the tiller in extending under the body at the lower portion thereof, around the body with sufficient clearance, and then over the top of the body in the region of the bight portion where the handle 21 is provided. The operator or user may freely swing the tiller without interference with the body and with minimum interference with the person of the occupant of the wagon. As seen, the wagon may also be used in the ordinary manner by adding the handle 21 as desired.

A non-turning rear bolster 26 is secured to the body 11 near the rear portion thereof by means of nut and bolt assemblies 30. The usual braces 27 are provided for adding strength and rigidity to the rear bolster 26. A rear axle 28 is carried by the rear bolster 26 in the usual manner. Rear wheels 29 are journaled on the rear axle 28 as is usual.

My improved coaster wagon incorporates a unique brake structure. For this a bracket support 32 having end wings 32A extending at right angles therefrom at its opposite ends is secured to the rear of the wagon body 11 by means of nut and bolt assemblies 33. The wing portions 32A are provided with aligned openings having a common axis at right angles to the longitudinal axis of the wagon.

A brake member 35, preferably made of steel tubing formed as illustrated, has a top horizontal bar portion 35A disposed as shown. Extending downwardly from the portion 35A at the opposite ends thereof are upright side portions 35B generally parallel to each other. Extending laterally outward from the lower ends of the portions 35B are portions 35C which are generally parallel to the top portion 35A and which are positioned as shown in the planes of the respective rear wheels 29. Upon the lower end portions 35C being swung forwardly toward the wheels 29, they frictionally engage the same and provide a braking action for the wagon. Two nut and bolt assemblies 34 extend through aligned openings in the side portions 35B and wing portions 32A, respectively. The bolts of the nut and bolt assemblies 34 provide pivot pins upon which the brake member 35 may swing on the common axes of the said bolts. The mass of the brake member 35 is so distributed that the heavier portion is below the axis of the pivots provided by the said bolts so that gravity tends to maintain the brake member 35 in a generally upright position as illustrated, for example, in FIGURE 3. By the operator or occupant of the wagon pressing with his hand or foot rearwardly upon the top horizontal portion 35A, the lower end portions 35C are pressed forwardly against the periphery or tread of the rear wheels 29 so as to frictionally engage and brake the same.

For riding the coaster wagon with one knee of the occupant on the body of the wagon, it is preferable that the sides 12 be removed and then the foot of the occupant's leg so supported on the wagon may readily press rearwardly on the portion 35A. However, if desired, the hand of the occupant riding in the wagon may be used for moving the portion 35A rearwardly. Upon release of the portion 35A, the brake structure moves to its upright position and the lower end portions 35C move away from the rear wheels 29.

It is to be noted that by the combination of structural features herein described and shown, unique coasting characteristics are obtained and versatility in a wagon is provided.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and scope of the invention as hereinafter claimed.

What is claimed is:

1. In a wagon having a body, rear wheels journaled on a rear axle carried by a rear bolster, and front wheels journaled on the front axle carried by a front bolster, said front bolster being pivotable about a kingpin axis for determining the direction of travel for the wagon, said front bolster having side portions extending on the opposite sides of said axis toward said front wheels, the improvement of a tiller structure having free end portions secured to said side portions, respectively, of the front bolster at substantially equal distances from said axis, a bight portion being disposed in a generally horizontal plane and extending above said body generally parallel to said front axle, said bight portion being generally over the said front axle, and connecting portions joining the said free end portions and the opposite ends of said bight portion, said connecting portions extending forwardly from said free end portions, thence upwardly and rearwardly to the opposite ends of said bight portion to clear said wagon body in the swinging of said bight portion about said kingpin axis, said tiller structure providing for the steering of said wagon by the operator swinging said bight portion about said axis and the corresponding swinging of said front bolster.

2. The improvement as claimed in claim 1 and in which said bight portion and said front axle are generally in the same vertical plane.

3. The improvement as claimed in claim 1 and in which said free end portions are spaced apart less than said ends of the bight portion, and in which said connecting portions diverge from each other as they extend upwardly and rearwardly to the opposite ends of said bight portion.

4. Steering mechanism for a coaster wagon having a front bolster turnable on the axis of a vertical kingpin pivotally connecting the wagon body and front bolster for directing the front wheels journaled on the front bolster, comprising, a tiller in the form of a looped bar having spaced free end portions secured to said front bolster on opposite sides of said axis and a bight portion over said wagon body disposed in a general horizontal plane above the horizontal plane of said front bolster and in the same general vertical plane thereof, said front bolster being below said wagon body and said bight portion being above said wagon body, said bight portion and front bolster being generally parallel to each other, said tiller having connecting portions extending upwardly from said free end portions forwardly of said wagon body and to said bight portion to allow swinging of the tiller free of interference with the wagon body, the said coaster wagon being steerable from above the wagon body by the manual swinging of said bight portion to cause corresponding turning of said bolster.

5. Steering mechanism for a coaster wagon having a body, a kingpin carried thereby, a front bolster below the body and turnable about said kingpin, the front bolster carrying the front axle of the wagon for the turning of the wagon wheels journaled on the bolster, comprising in combination, a tiller structure having two spaced lower portions disposed generally longitudinally of the wagon and secured to the said front bolster adjacent opposite ends thereof, a bar portion over said wagon body extending in a generally horizontal plane above the horizzontal plane of said front bolster in the same general vertical plane thereof and generally parallel to said front axle, and side portions connecting the opposite ends of said bar portion and said spaced lower portions, respectively, said side portions extending forwardly from the axis of said bar portion and downwardly from the horizontal plane thereof, and hence rearwardly to join said spaced lower portions to avoid interference with said body located between the said bolster and bar portion, the swinging of said bar portion effecting corresponding swinging of the first axle about said kingpin.

6. In a coaster wagon having a body, a front axle carried on a front bolster swingable on a verticle pivot relative to the body for steering the front wheels journaled on said front axle, a rear axle carried on a rear bolster secured to said body and having parallel rear wheels journaled thereon, the combination of a tiller structure for swinging said front bolster to steer said wagon, and a brake structure for engaging said rear wheels to brake the wagon, said tiller structure having a bar portion disposed over the body in a generally horizontal plane and connecting portions extending forwardly and downwardly around the periphery of the body to freely swing thereabout without interference from the body upon the swinging of the tiller structure, said connecting portions being connected to said front bolster adjacent opposite ends thereof to swing the front bolster on said verticle pivot in correspondence with the swinging of said bar portion, the said brake structure having a pair of side-bar portions pivotally carried by said body to swing on pivot axes parallel to said rear axle, said side-bar portions swinging generally downwardly from said pivot axes, a crosspiece portion joining the upper ends of said side-bar portions to swing the same in unison upon the crosspiece portion being swung about said pivot axes, and a pair of wheel-engaging portions each carried by a side-bar portion adjacent the lower end thereof and extending in the plane of the adjacent rear wheel to brakingly engage the periphery thereof upon being swung thereagainst, the rearward swinging of the crosspiece portion moving both the wheel-engaging portions forwardly against the rear wheels, respectively, to brake the wagon, the arrangement of tiller structure and brake structure permitting the occupant of the coaster wagon to steer by swinging the tiller bar portion in said horizontal plane and to brake by swinging said horizontal brake crosspiece portion rearwardly.

7. The combination as claimed in claim 6 and including tongue-engaging means carried by said front bolster for selective attachment of a wagon tongue thereto.

8. The combination as claimed in claim 6 and in which the said tiller bar portion is in a horizontal plane at a higher elevation than the horizontal plane of said brake crosspiece portion for ready manipulation by the occupant and in which said brake crosspiece portion is located adjacent the rearward periphery of the wagon body for ready engagement by the occupant at any location along the length of the brake crosspiece portion to simultaneously brake both rear wheels.

9. In a coaster wagon having a body, a rear axle carried on a rear bolster secured to said body and having parallel rear wheels journalled thereon, a brake structure for engaging said rear wheels to brake the wagon, said brake structure having a pair of side-bar portions pivotally carried by said body to swing on pivot axes parallel to said rear axle, said side-bar portions swinging generally downwardly from said pivot axes, a cross-piece portion joining the upper ends of said side-bar portions to swing the same in unison upon the cross-piece portions being swung about said pivot axes, and a pair of wheel-engaging portions each carried by a side-bar portion adjacent the lower end thereof and extending in the plane of the adjacent rear wheel to brakingly engage the periphery thereof upon being swung thereagainst, the rearward swinging of the cross-piece portion moving both the wheel-engaging portions forwardly against the rear wheels, respectively, to brake the wagon, the brake structure permitting the occupant of the coaster wagon to brake by swinging the brake cross-piece portion rearwardly.

10. The brake structure claimed in claim 9, in which the brake cross-piece portion is located adjacent the rearward periphery of the wagon body for ready engagement by the occupant at any location along the length of the brake cross-piece portion to simultaneously brake both said wheels.

References Cited

UNITED STATES PATENTS

| | | | |
|---|---|---|---|
| 809,912 | 1/1906 | Ferris | 280—87.01 |
| 1,391,083 | 9/1921 | Stich | 280—87.01 |
| 2,127,104 | 8/1938 | Bucklin | 280—87.01 |
| 2,481,114 | 9/1949 | Hayhurst | 280—87.01 |
| 2,676,054 | 4/1954 | Pasin | 296—32 |
| 2,986,406 | 5/1961 | Kahl | 280—87.05 |

LEO FRIAGLIA, *Primary Examiner.*